United States Patent
Wu

(10) Patent No.: US 10,483,884 B2
(45) Date of Patent: Nov. 19, 2019

(54) ELECTRIC TOOL CONTROL CIRCUIT

(71) Applicant: SUZHOU CLEVA ELECTRIC APPLIANCE CO., LTD., Suzhou, Jiangsu Province (CN)

(72) Inventor: Fufei Wu, Jiangsu (CN)

(73) Assignee: Suzhou Cleva Electric Appliance Co., Ltd, Suzhou, Jiagsu Province (CN)

(*) Notice: Subject to any disclaimer, the term of this patent is extended or adjusted under 35 U.S.C. 154(b) by 84 days.

(21) Appl. No.: 15/531,043

(22) PCT Filed: Nov. 18, 2015

(86) PCT No.: PCT/CN2015/094867
§ 371 (c)(1),
(2) Date: May 26, 2017

(87) PCT Pub. No.: WO2016/082701
PCT Pub. Date: Jun. 2, 2016

(65) Prior Publication Data
US 2018/0316292 A1    Nov. 1, 2018

(30) Foreign Application Priority Data
Nov. 27, 2014  (CN) .......................... 2014 1 0695333

(51) Int. Cl.
*H02H 7/20* (2006.01)
*H02P 7/06* (2006.01)
(Continued)

(52) U.S. Cl.
CPC ............ *H02P 7/285* (2013.01); *H02P 29/032* (2016.02); *B23D 51/16* (2013.01)

(58) Field of Classification Search
CPC .................................. H02P 1/16; H02P 27/02
See application file for complete search history.

(56) References Cited

U.S. PATENT DOCUMENTS

2011/0221364 A1*  9/2011  Horng ....................... H02P 6/22
                                                                    318/285
2012/0008238 A1*  1/2012  Thiele ................... H02H 7/0838
                                                                    361/18
(Continued)

FOREIGN PATENT DOCUMENTS

CN            1411136 A        4/2003
CN          102497143 A        6/2012
(Continued)

OTHER PUBLICATIONS

International Search Report for PCT/CN2015/094867, dated Feb. 22, 2016.

*Primary Examiner* — Bickey Dhakal
*Assistant Examiner* — Charles S Laughlin
(74) *Attorney, Agent, or Firm* — JK Intellectual Property Law, PA

(57) ABSTRACT

An electric tool control circuit includes a central control module, a motor drive module, a motor, and a working parameter detection module. The working parameter detection module is separately electrically connected to the motor and the central control module, and the working parameter detection module can return a parameter that is detected when the motor works to the central control module. The motor drive module is separately electrically connected to the motor by using first and second switch modules, and the motor drive module controls the first and second modules to be discontinuously on and off. The features of first switch module and the second switch module being on and off are always contrary, that is, when a first switch is on, a second switch is off, and when the first switch is off, the second switch is on.

15 Claims, 4 Drawing Sheets

(51) Int. Cl.
*H02M 1/08* (2006.01)
*H02P 7/285* (2016.01)
*H02P 29/032* (2016.01)
B23D 51/16 (2006.01)

(56) References Cited

U.S. PATENT DOCUMENTS

2013/0050316 A1* 2/2013 Murray .................... B41J 29/38
347/10
2013/0154711 A1* 6/2013 Kuttenkuler ..... H03K 17/08128
327/326
2016/0197507 A1* 7/2016 Blanc ...................... H02J 50/10
307/20

FOREIGN PATENT DOCUMENTS

| CN | 203399033 U | 1/2014 |
| CN | 103904966 A | 7/2014 |
| CN | 103944487 A | 7/2014 |
| CN | 104170240 A | 11/2014 |

* cited by examiner

ELECTRIC TOOL CONTROL CIRCUIT

CROSS-REFERENCE TO RELATED APPLICATION

This application is a national stage of International Application No. PCT/CN2015/094867, filed Nov. 18, 2015, and claims benefit to Chinese Patent Application No. 201410695333.0 filed Nov. 27, 2014, both of which are incorporated by reference herein.

TECHNICAL FIELD

The present disclosure relates to an electric tool control circuit, especially to the control circuit of an electric reciprocating saw.

BACKGROUND

Motors of some electric tools need to have stable output during operation thereof, especially, it is important to keep the motor with a relatively stable rotating speed in the use of the electric tool that requires high power output. For example, in order to obtain a better cutting effect, the speed of the motor needs to be relatively stable when the reciprocating saw is started, if the motor in the process of rotation suddenly fasts or slows rotation speed, which is then easy to cause beating phenomenon of the reciprocating saw. Usually, the reciprocating saw uses a silicon controlled rectifier to achieve the motor's power on and off, rotation speed of the motor is controlled by adjusting the proportion of power on and off times, that is, via duty cycle to adjust the motor's rotation speed. However, the high-speed rotating motor produces an induced electromotive force in an opposite direction to an original direction of the induced electromotive force, the reversing electromotive force will generate an impedance to the power supply when it is turned on again, this impedance makes it impossible to convert electric energy into kinetic energy, and will increase heat generated by the motor. As the motor produces more heat, the electric energy can't be effectively converted into the kinetic energy, so when the motor is loaded, and required torque thereof becomes larger, the speed of the motor will drop rapidly, and when the load decreases, the speed of the motor will be rapidly increased, which will cause the motor output to be unstable, when the reciprocating saw began to cut, it is easy to cause beating phenomenon thereof, and adversely affecting the cutting effect.

Therefore, a new technical program needs to be proposed to solve the above problems.

SUMMARY

In order to solve the above problems, the present disclosure provides an electric tool control circuit comprises a central control module, a motor drive module, a motor, and a working parameter detection module; the central control module being electrically connected to the motor drive module, and the central control module controlling the turn on and off of the motor drive module; the control circuit comprising a protection module which can prevent a motor peripheral circuit from being damaged by the motor clutter produced during running of the motor; the working parameter detection module being electrically connected to the motor and the central control module respectively, and the working parameter detection module returning a parameter that is detected during running of the motor to the central control module. The motor drive module is electrically connected to the motor respectively by a first switch module and a second switch module, and the motor drive module controls the first and second modules to be discontinuously on and off, features of the first switch module and the second switch module being on and off are always contrary, that is, when the first switch is on, the second switch is off, and when the first switch is off, the second switch is on.

Preferably, the first and second switch modules, the motor drive module and the motor are electrically connected to form a half-bridge driving circuit.

Preferably, field effect transistors are used as the first and second switches.

Preferably, the working parameter detection module detects a current parameter of the motor during running of the motor and then return the current parameter to the central control module.

Preferably, the protection module has a spike absorption module and a follow current module, which respectively form a circuit loop with the motor.

Preferably, the spike absorption module includes a first spike absorption module and a second spike absorption module.

Preferably, a capacitor is used as the first spike absorption module, a schottky diode is used as the second spike absorption module, and a diode is used as the follow current module.

Preferably, the working parameter detection module has a current detection module which detection time is inversely proportional to magnitude of detected current value, when the motor is loaded to increase rotate speed.

Preferably, the working parameter detection module has a current detection module which detection time is proportional to magnitude of detected current value, when the motor idling at high speed and reducing its speed.

The protection module can eliminate the spikes generated by the motor when the motor is operating to protect the first and second switch modules.

The first switch module controls duty cycle of power supply when the motor is running, so that the motor reaches the proper speed. The first spike absorption module absorbs reverse electromotive force generated by both ends of the motor when the first switch module is turned off to protect the first and second switch modules, at the same time, the follow current module turns on, then the second switch module turns on, the second switch module opens to release the induced electrical energy generated by the motor, which reduces the impedance effect of the motor when the first switch module is turned on again, and reduce heat generated by the motor and the first switch module. The second spike absorption module absorbs spikes generated by the motor commutation during the motor operating to protect other electronic components. The turn-on of the first switch module and the turn-off of the second switch module are always carried out at the same time, but it takes a certain time to turn on due to the characteristics of the switch module itself, so that the first switch is always open slower than the follow current module and the first spike absorption module, the same as the follow current module is always open slower than the first spike absorption module. As heat generated by the motor and the first switch module are reduced, the electric tool control circuit can effectively convert the electric energy into kinetic energy relative to the traditional motor control mode. So the motor speed is more stable and affected by the load becomes smaller, and beating phenomenon of the electric chain saw is also greatly reduced when the motor is loaded and requirement of torque becomes larger.

DETAILED DESCRIPTION OF THE PREFERRED EMBODIMENTS

The following is nonrestrictive detailed description of the technical proposal of the present disclosure in combination with drawings.

Figure 1:
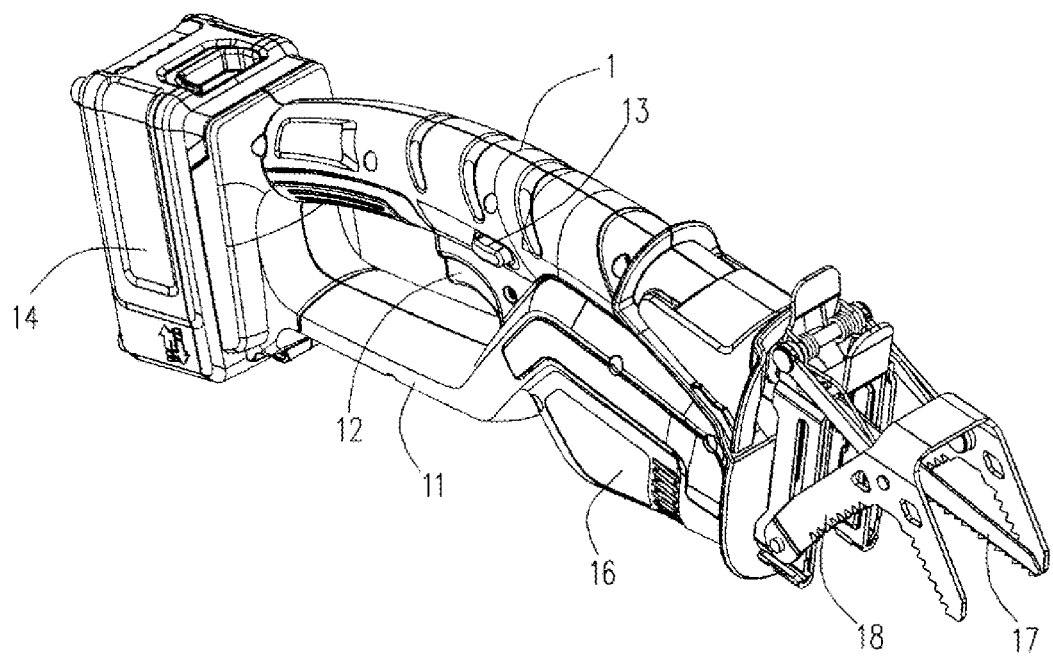
FIG. 1 is a schematic drawing of the reciprocating saw according to an embodiment of the invention.

The present disclosure uses the reciprocating saw as an electric tool in the embodiment to illustrate the technical proposal. However, the technical proposal of the present invention can not only apply to reciprocating saws, but also apply to other electric tools, such as tree trimmer, hand-held brush cutter, etc. As shown in FIG. 1, the reciprocating saw comprises a main body 1, a handle portion 11 hold by the operator being formed on the main body 1. A trigger switch 12 and a security lock 13 are formed on a lower part of the handle portion 11, and the user presses the trigger switch 12 and security lock 13 down at the same time to start the tool. A battery pack 14 is provided a tail of the reciprocating saw, which can be separated from the tail of the reciprocating saw. A drive motor 16 is set at a front portion of the reciprocating saw, and the drive motor 16 drives a saw blade 17 which is provided at a front end of the reciprocating saw reciprocating motion through a built-in speed change mechanism and an eccentric wheel therein. An upper part of the saw blade 17 is provided with a clamp device 18 for clamping wood, in order to steadily the reciprocating saw work against the wood. The reciprocating saw can adjust speed by the trigger switch 12 in order to adapt to different wood material hardness, and so on. As the stroke of the trigger switch 12 increases, rotation speed of the motor 16 increases, so increases the frequency the reciprocating motion of the saw blade. A sensor will detect the stroke of the trigger switch 12 and return the stroke signal back to a built-in control panel in the reciprocating saw, and the control panel adjusts the frequency of reciprocating motion of the reciprocating saw by adjusting the rotational speed of the motor.

Figure 2:
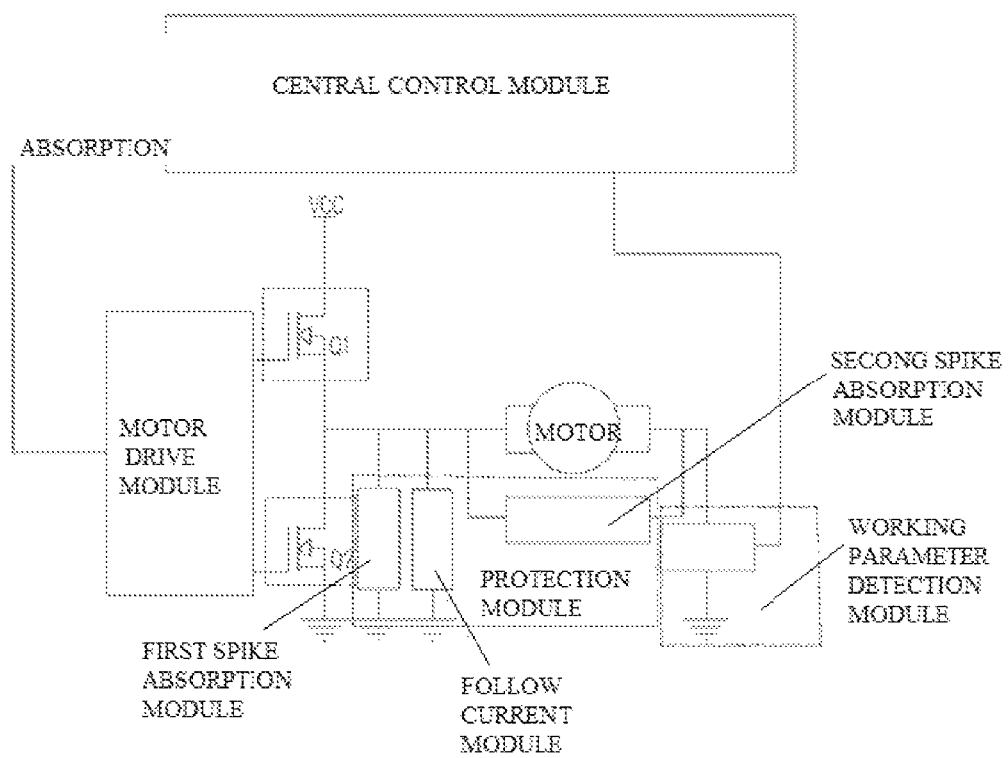
FIG. 2 is a schematic drawing of the control circuit module.

A control circuit in the above-described control board is shown in FIG. 2. The control circuit comprises a central control module which is able to receive signal of a working parameter detection module connected thereto and to send a control signal to components operating on the reciprocating saw. The control circuit further comprises a motor drive module which is electrically connected with the central control module, and the central control module sends a control signal to the motor drive module to drive the motor to rotate. The control signal selectively includes motor on and off parameters, motor duty cycle parameters and so on. The motor drive module is electrically connected to the motor through a first switch module Q1 and a second switch module Q2. When the first switch module Q1 is turned on, the motor is energized, and when the first switch module Q1 is turned off, the motor is de-energized. When the first switch module Q1 is turned on, the second switch module Q2 is turned off, and when the first switch module Q1 is turned off, the second switch module Q2 is turned on. When the second switch module is turned on, it releases part of induced electrical energy generated by rotating of the motor. The motor protection module is electrically connected to the motor and is used for filtering out clutter generated during operating of the motor to prevent control elements and peripheral circuit from being damaged by the clutter. The control circuit is also provided with a working parameter detection module for detecting current, voltage, speed, temperature and other operating parameters during running of the motor, and the working parameter detection module can simultaneously detect one or more of the above-mentioned parameters. The working parameter detection module can return the detected parameters to the central control module, the central control module judges working state of the motor according to the detected motor operating parameters, and then adjusts and controls acceleration, deceleration, on or off of the motor. The central control module can have one or more of the functions described above. The control circuit further comprises a power supply terminal VCC which is connected with the first switch module Q1. The first switch module Q1 controls power on and off of the power supply terminal.

The protection module further shown in FIG. 2 includes a first spike absorption module and a second spike absorption module. The second spike absorption module is connected in parallel at both ends of the motor, and is used to absorb spikes generated from switching of motor's brush. The second spike absorption module has a fixed threshold voltage, and the second spike absorption module makes the voltage across the motor equal to the threshold voltage when voltage value of the spikes generated by the motor is greater than the threshold voltage. When the motor is running, a pulse spike is produced from the switching of the motor's brush, and voltage value of the pulse spike is far beyond voltage value of components in the peripheral circuit connected with the motor, and the second spike absorption device can stabilize its voltage within the voltage range of the components. The first switch module is turned off and turned on periodically when the motor is operated. When the first switch module Q1 is turned off, the motor generates an induced electromotive force which is also larger than the voltage of the peripheral circuit. The first spike absorption module can directly absorb some of the induced electrical energy generated by the motor. The second switch module Q2 in the protection circuit is turned on after the first spike absorption module is turned off and a follow current module continues the induced current which is generated by the motor flowing in the original direction to keep the motor running.

Figure 3:
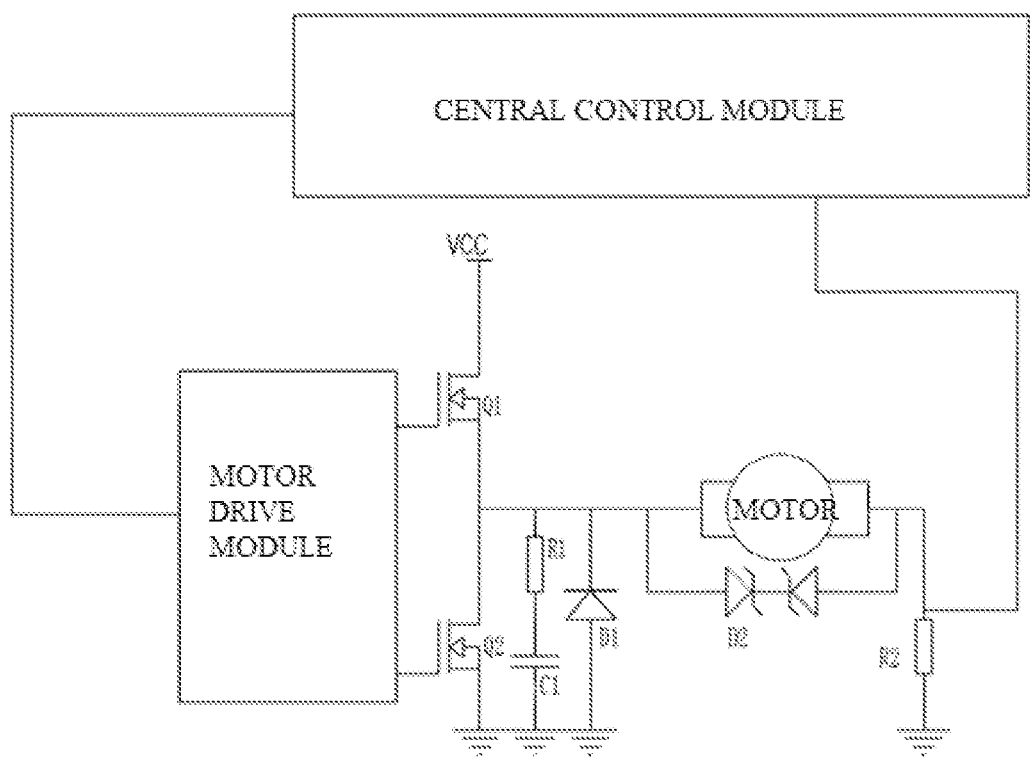
FIG. 3 is a schematic drawing of the control circuit.

Referring to FIG. 3, both the first switch module Q1 and the second switch module Q2 are using a MOSFET. Conductive states of the first switch module and the second switch module are always contrary, that is, when the first switch module Q1 is conductive, the second switch module Q2 is nonconductive, and when the first switch module Q1 is nonconductive, the second switch module Q2 is conductive. The conductive states of the first switch module Q1 and the second switch module Q2 are controlled by the motor drive module which can be realized by hardware, and the motor drive module receives control signal of the central control module. The second spike absorption module comprises a TVS tube D2 which is capable of filtering out the spikes generated during switching of the motor brush, thereby protecting the peripheral circuit. The first spike absorption module comprises a resistor R1 and a capacitor C1. The first spike module is capable of absorbing the spikes generated by sudden power failure of the motor when the first switch module is nonconductive, thereby protecting the first switch module Q1 and the second switch module Q2. The follow current module comprises a freewheeling diode D1. The first switch module controls the duty cycle of the motor when the motor is started, so that the motor reaches a proper speed. During operating of the motor, the TVS tube absorbs the spikes generated by the switching of the motor to protect the other electronic components. The second spike absorption module absorbs reverse electromotive force generated at both ends of the motor when the first switch module Q1 is turned off, for the purpose of preventing damage to the follow current module and the second switching module Q2. When the follow current module D1 and the second switch module Q2 are turned on, the second switch module Q2 opens to release the induced electrical energy generated by the motor, which reduces the impedance effect of the motor when the first switch module Q1 is turned on again, and reduce heat generated by the motor and the first switch module Q1. The turn-on or turn-off of the first switch module and the second switch module is always carried out at the same time. As heat generated by the motor is reduced, the electric tool control circuit can effectively convert the electric energy into kinetic energy, relative to the traditional motor control mode. So when the motor is loaded and the required torque thereof becomes larger, the motor speed is more stable, and the motor speed affected by the load becomes smaller, and the beating phenomenon of the electric reciprocating saw is also greatly reduced.

The working parameter detection module is also provided with a current sampling resistor R2, which is electrically connected to the motor. The resistor R2 can collect current from different working conditions of the reciprocating saw and return the current back to the central control module. The central control module will compare the feedback current with a preset current value and determine working state of the reciprocating saw. The motor stalls or excessive load acts on the reciprocating saw which will cause the current of the motor being too large, the central control module can be timely shut down power of reciprocating saw to make it stop working. The working parameter detection module can also provide a temperature detection module to detect the temperature of the motor, and a voltage detection module detecting the voltage of the battery pack, so that the motor can be shut down when the motor is overheated or under voltage.

Figure 4:
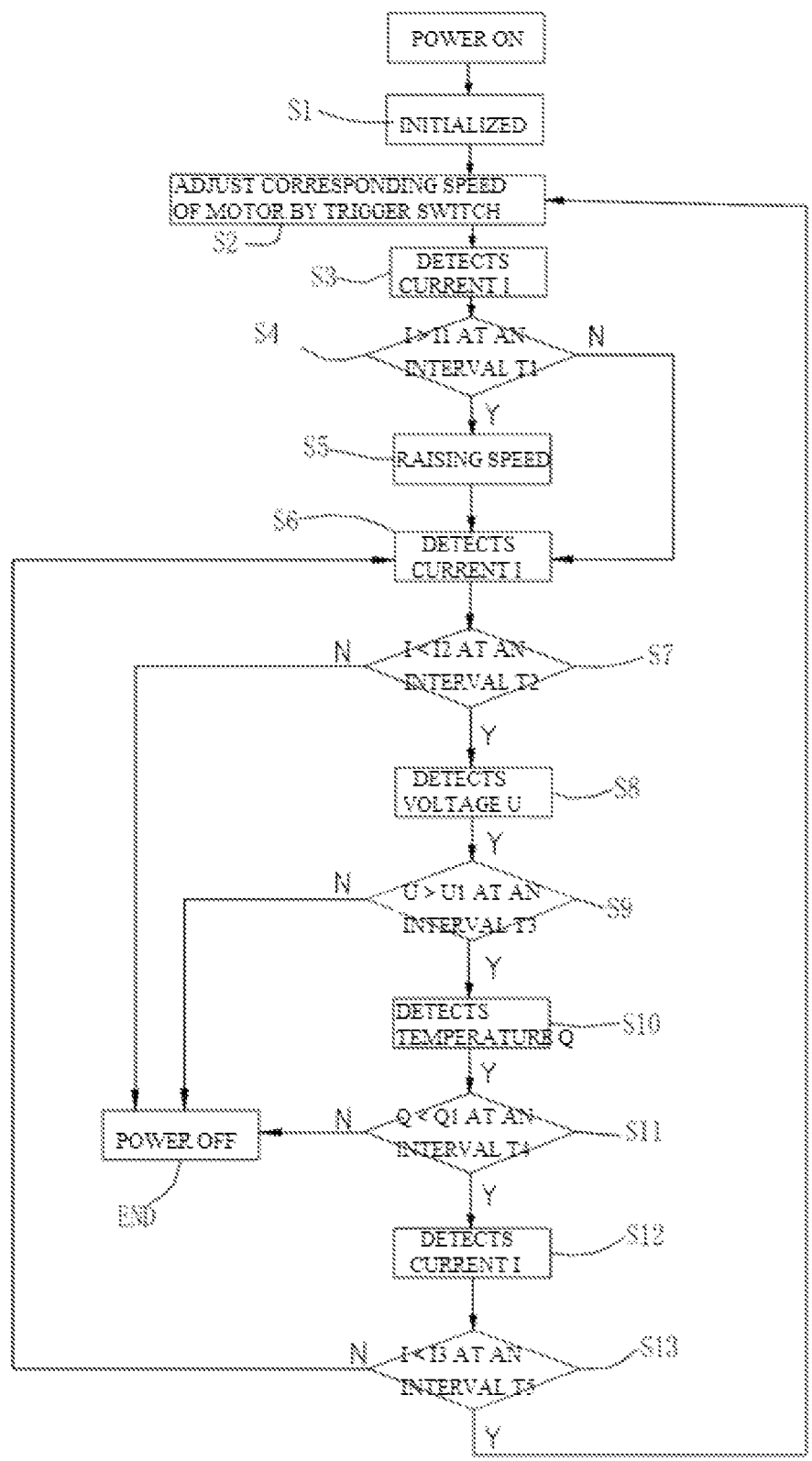
FIG. 4 is a schematic drawing of control processes of the control circuit.

According to FIG. 4, the central control module presets a control program for the reciprocating saw, which has following control flow: An operation S1 is initialized after the reciprocating saw is power on, and includes setting input and output states, the central control module adjusts corresponding speed S2 of the motor by the sensor detecting the stroke of trigger switch. The central control module determines initial speed of activating of the reciprocating saw according to the stroke of trigger switch. After the machine starts, the current detection module performs a first current I detection S3 to the motor, judges a step S4, if the detected current I is smaller than a loaded current I1 at an interval T1, performs a branch N directly to have a second current detection S6. The load current I1 is a determined constant value based on different powers of the motors, and the current of the motor is greater than the load current I1 when a load is applied to the motor. If the detected current I is greater than the load current I1 at the specified time interval T1, then it indicates there is a load being applied to the motor of the reciprocating saw, then performs a branch Y, that is the central control module sends a signal of raising a speed S5 to the motor drive module, the signal including the duty cycle signal of the motor. The central control module increases the speed of the motor by increasing the duty cycle. If the current I is greater than a maximum current I2 (S7) during a time interval T2, then the device performs an N branch, that is the central control module sends a stop signal to the motor drive module to enter a END state of power off, and the motor carries out a shutdown protection process. The maximum current I2 is current limit of the motor, heat produced by the motor increases at this time, and when the motor is running at a current greater than the limit current I2 for a long time, mass heat will be produced to damage the motor. If the detection current I is lower than the maximum current I2, the Y branch is executed which detects voltage U of the battery pack (step S8), and if the voltage U is lower than the minimum working voltage of the battery pack U1 in a time interval T3 (step S9), power of the battery pack is about to run out at this time, then the control module performs the branch N and makes the motor be power off (END) to protect the battery. When the above voltage is greater than the minimum working voltage U1 of the battery pack, the temperature detection Q is executed (step S10), and then enter judgment step S11, if operating temperature in a time interval T4 period is higher than a motor protection temperature Q1, then enter the state of the power off (END) of the motor. If the operating temperature is lower than the motor protection temperature Q1 in the time interval T4, a third current I detection is performed (S12). If the detection current I is less than the operating current I3 in a time interval T5, then the motor is in a state of non-loaded and high-speed rotation, the central control module performs a Y branch and jumps back to the step S2 to decrease the motor speed to corresponding speed of the trigger switch stroke. When the corresponding speed of the trigger switch stroke is lower than the speed of the motor at the time of operation, the corresponding current value will be reduced. Therefore, the current value of the motor will be smaller than the load current I1 in the time interval T1 when the current is detected again, and the speed of motor will continue to rise to the corresponding speed of the trigger switch stroke.

In order to make feedback of the reciprocating saw be more rapid and sensitive to the load, length of the current detection time T1 is inversely proportional to magnitude of the detected current value, that is, the greater the detected current is, the shorter the current detection time T1 is. When the user operates the reciprocating saw, the greater the force applied on the saw blade, the shorter the time of increasing speed of the reciprocating saw, so that the user has a good experience. The relationship between the detection time T1 and the current can be described by the function T1=f (I), which makes the detection time decrease as current I increases. f (I) can be a linear function or a non-Linear function, or discrete set of mapping relationships. Similarly, the current detection time T5 is proportional to the magnitude of the detected current, that is, the smaller the detected current, the shorter the current detected time T5, so that when the user makes the reciprocating saw convert suddenly from a cutting state to a non-cutting state, the motor speed will be quickly reduced to reduce high-speed idle time of the motor.

The invention claimed is:
1. An electric tool control circuit comprising:
a central control module, a motor, a motor drive module, a working parameter detection module, a first switch module and a second switch module;

the central control module being electrically connected to the motor drive module, and the central control module controlling turn on and off of the motor drive module;

a protection module which can prevent a motor peripheral circuit from being damaged by motor clutter produced during running of the motor; and the working parameter detection module being electrically connected to the motor and the central control module, and the working parameter detection module returning a parameter that is detected during running of the motor to the central control module, wherein the motor drive module is electrically connected to the motor by a first switch module and a second switch module, and the motor drive module controls the first and second switch modules to be discontinuously on and off, the respective statuses of the first switch module and the second switch module being on and off are always contrary so that when the first switch module is on, the second switch module is off, and when the first switch module is off, the second switch module is on, the working parameter detection module having a current detection module which has a detection time inversely proportional to a magnitude of current value detected when the motor is loaded and increases its rotation speed.

2. The electric tool control circuit according to claim 1, wherein the protection module having a spike absorption module and a follow current module, which respectively form a circuit loop with the motor, the spike absorption module including a first spike absorption module and a second spike absorption module.

3. The electric tool control circuit according to claim 2, wherein the first spike absorption module is a capacitor, the second spike absorption module is a schottky diode, and the follow current module is a diode.

4. The electric tool control circuit according to claim 2, wherein the first spike absorption module includes a resistor and a capacitor connected in series.

5. The electric tool control circuit according to claim 1, wherein the first and second switch modules, the motor drive module and the motor are electrically connected to form a half-bridge driving circuit.

6. The electric tool control circuit according to claim 5, wherein field effect transistors are used as the first and second switch modules.

7. The electric tool control circuit according to claim 1, wherein the working parameter detection module detects a current parameter of the motor during running of the motor and then communicates the current parameter to the central control module.

8. The electric tool control circuit according to claim 1, wherein the working parameter detection module has a current detection module which has a detection time proportional to a magnitude of current value detected when the motor is idling at high speed and reduces its speed.

9. An electric tool control circuit comprising:
a central control module, a motor, a motor drive module, a working parameter detection module, a first switch module and a second switch module;

the central control module being electrically connected to the motor drive module, and the central control module controlling turn on and off of the motor drive module;

a protection module which can prevent a motor peripheral circuit from being damaged by motor clutter produced during running of the motor; and the working parameter detection module being electrically connected to the motor and the central control module, and the working parameter detection module returning a parameter that is detected during running of the motor to the central control module, wherein the motor drive module is electrically connected to the motor by a first switch module and a second switch module, and the motor drive module controls the first and second switch modules to be discontinuously on and off, the respective statuses of the first switch module and the second switch module being on and off are always contrary so that when the first switch module is on, the second switch module is off, and when the first switch module is off, the second switch module is on, the working parameter detection module has a current detection module which has a detection time proportional to a magnitude of current value detected when the motor is idling at high speed and reduces its speed.

10. The electric tool control circuit according to claim 9, the protection module having a spike absorption module and a follow current module, which respectively form a circuit loop with the motor, the spike absorption module including a first spike absorption module and a second spike absorption module.

11. The electric tool control circuit according to claim 10, wherein the first spike absorption module is a capacitor, the second spike absorption module is a schottky diode, and the follow current module is a diode.

12. The electric tool control circuit according to claim 10, wherein the first spike absorption module includes a resistor and a capacitor connected in series.

13. The electric tool control circuit according to claim 9, wherein the first and second switch modules, the motor drive module and the motor are electrically connected to form a half-bridge driving circuit.

14. The electric tool control circuit according to claim 13, wherein field effect transistors are used as the first and second switch modules.

15. The electric tool control circuit according to claim 9, wherein the working parameter detection module detects a current parameter of the motor during running of the motor and then communicates the current parameter to the central control module.

* * * * *